3,068,801
CENTRIFUGAL IMPELLER PUMPS
William Murray, The Wharf, Clapham St.,
Leamington Spa, England
Filed Aug. 31, 1959, Ser. No. 837,026
Claims priority, application Great Britain Sept. 2, 1958
5 Claims. (Cl. 103—103)

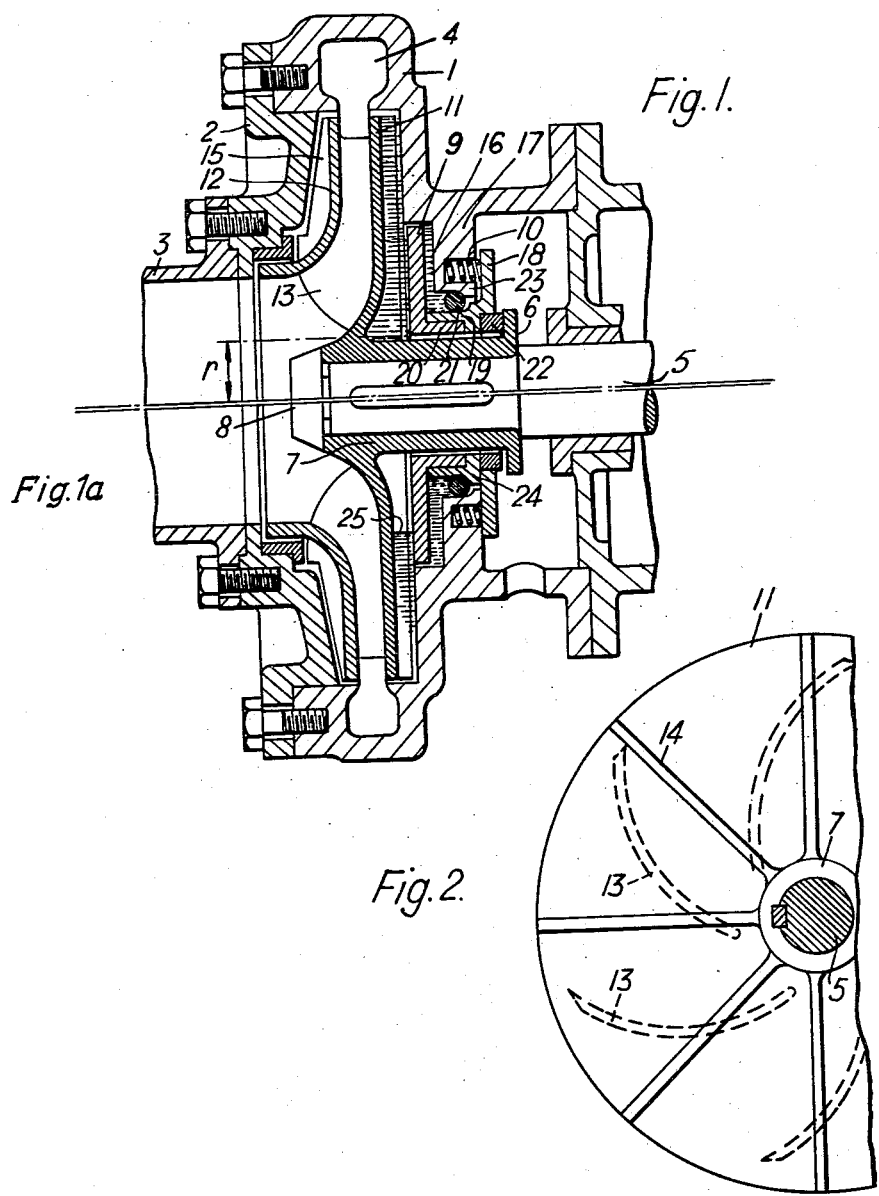

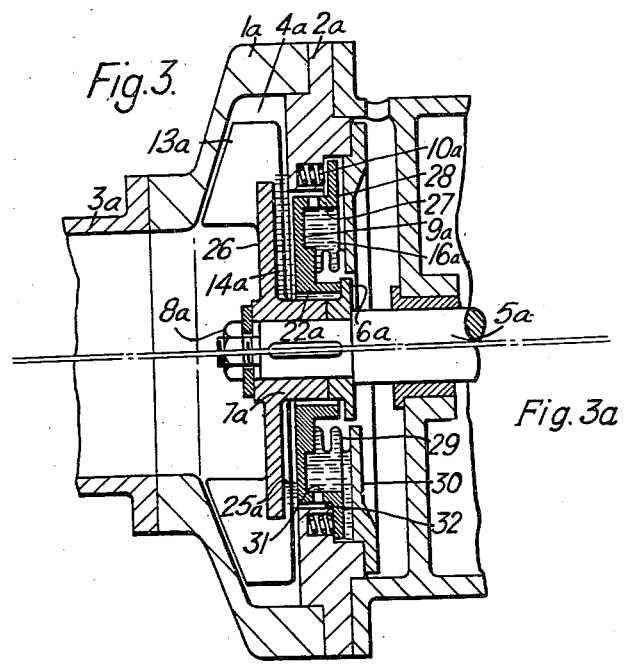
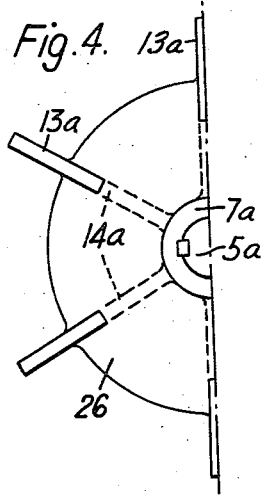

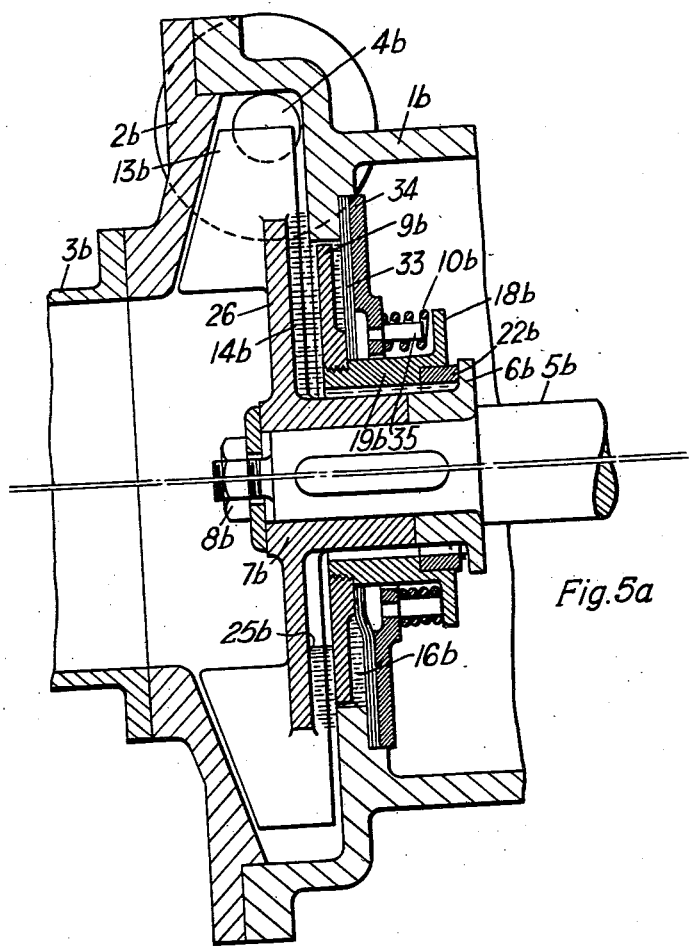

The present invention relates to the sealing of the shafts of centrifugal impeller pumps of the single entry type by means of a combined static and hydrodynamic seal device in which the static seal is a rotary sliding contact seal comprising one member carried by the shaft and a co-operating member which is axially displaceable with reference thereto, which members co-operate by relative rotary rubbing contact, and in which the hydrodynamic seal comes into effect when a sufficient speed of rotation of the impeller is reached and lessens or eliminates the pressure contact, and consequently the wear, between the two members of the contact seal.

The invention provides a centrifugal impeller pump, the shaft of which is sealed by a rotary sliding contact seal comprising one member which is carried by the shaft and a co-operating member which is carried by an axially displaceable wall, and wherein the pump impeller comprises a wall which partitions the impeller chamber in the radial sense and carries blades on one side to serve as the working blades and blades on the other side to serve as seal blades working in the space between the said walls and wherein the said axially displaceable wall forms a wall of an annular chamber which is sealed but has an opening or openings communicating with the space traversed by the seal blades which serve when the impeller is rotated at a sufficient speed to centrifuge liquid in the said space away from the shaft and to maintain part of the liquid centrifuged in the form of an annular liquid ring covering the said opening or openings so that the annular chamber is maintained filled and a pressure differential is set up on the opposite side of the said axially displaceable wall which lessens or eliminates the pressure contact between the members of the contact seal.

The term "blades" is used compendiously to include ribs, vanes or the like.

The action of the static seal is to prevent leakage under stationary conditions and at low running speeds of the pump while the hydrodynamic seal acts at high speeds up to full operational speed (and may be effective above full operational speed to allow of the pump being over-speeded). In the static condition the co-operating faces of the contact seal members will be in sealing contact and they are preferably radially extending faces which may be lapped to the desired smooth finish.

The said annular chamber may be sealed as aforesaid by means of a flexible sealed wall (e.g., bellows or diaphragm) or by a separate sealing ring between the casing and the said axially displaceable wall (or an axial extension thereof or axial part carried thereby). The aforesaid communicating opening may be formed by a circumferential gap round the axially displaceable wall and/or by way of holes or notches in the margin or periphery thereof.

The radial dimension of the seal blades can be determined to suit different operating conditions. Generally it will be required to seal against a positive, i.e., above atmospheric, inlet pressure. In this case the radial extent of the seal blades should be greater than that of the working blades. If the working blades extend inwardly to the same extent as the seal blades, the seal blades and the impeller wall should extend radially outwards beyond the outer tips of the working blades or in the case of a large inlet diameter of the impeller with the working blades extending short of the impeller hub, the required radial extent of the seal blades can be obtained without extending them outwards beyond the working blades. In some cases the seal blades may extend both inwardly and outwardly beyond the working blades.

The annular chamber may be sealed by a flexible wall, which may be a diaphragm marginally sealed to the pump casing and inwardly sealed to the said axially displaceable wall or may be a bellows sealed at one end of the pump casing and at the other end to the said axially displaceable wall. Alternatively the said chamber may be sealed by means of a sealing ring.

When the pump is stationary the two members of the static (contact) seal are forced into contact. This may be effected by springs which are suitably arranged so as to act upon the axially displaceable wall, assisted if desired by the flexible sealed wall (when present) and/or by the pressure of the fluid. If the fluid pressure is high the seal can be so dimensioned that its influence is moderate so that the contacting surfaces are not unduly loaded. Upon starting the pump a centrifugal pressure is generated by the seal blades and the pressure distribution in the space occupied by these blades, and in the said annular chamber formed by the said axially displaceable wall and the wall of the casing, is such that the contact pressure of the static seal is more and more reduced with increasing speed. Before the contact pressure becomes zero, i.e., before the static seal is broken, a rotating liquid ring with a free inner surface is formed by the seal blades. Consequently leakage is now prevented exclusively by the action of the sealing blades, and no wear of the static (contact) sealing surfaces can take place as the two contact seal members have come out of contact. If the pump works at a suction lift, i.e., if the inlet pressure falls below atmospheric, the rotating liquid ring adjusts itself automatically. In this case the diameter of the inner surface of the rotating liquid ring set up by the seal blades increases. A basic condition for the right operation of the seal is that the diameter of the said axially displaceable wall is larger than the largest possible inner diameter of the liquid ring so that the periphery of the said wall always remains immersed in the liquid. This means that the said annular chamber between the said wall and the wall of the casing is always filled with liquid.

In order that the invention may be the more readily understood, reference is hereinafter made to the three forms of construction illustrated by way of example in the accompanying drawings, in which FIGS. 1 and 1a show longitudinal half sections of a seal arrangement according to the invention in a centrifugal pump with a shrouded impeller, FIG. 2 is an end view of the pump impeller;

FIGS. 3 and 3a show corresponding half sections of another example of the seal arrangement according to the invention in an unshrouded (open) pump impeller, FIG. 4 is a front view of the impeller;

FIGS. 5 and 5a show corresponding half sections of a similar design with a modification of the resilient connection between the pump casing and the axially displaceable wall.

In all the figures the reference 1 represents the pump casing, 2 the front cover, 3 the inlet pipe, 4 the discharge duct, 5 the pump shaft, 6 the rotary portion of the static seal, 7 the impeller hub, 8 the fixing screw or nut of the impeller, 9 an axially displaceable, non-rotating wall, carrying the axially displaceable member of the static seal, and 10 the spring members tending to force the two portions of the static seal into contact, these reference numerals having different index letters in FIGS. 3, 3a and 5, 5a.

The upper halves of all figures show the static seals in the closed positions while the lower halves show the open positions which correspond to the operating conditions of the pump. Referring now in particular to FIGS. 1, 1a and 2 it will be seen that the pump impeller consists of two shrouds 11, 12 with the curved working blades 13 between them. The shroud 11 forms the previously described wall which partitions the impeller chamber. The outer side of the shroud 11 is fitted with seal blades 14 of the straight radial type. They have a greater radial length than the working blades 13, and this condition is fulfilled by extending them, together with the shroud 11, beyond the tips of the blades 13, as the inner radius $r$ is approximately the same for the blades 14 and 13. In this case, the shroud 12 also has the same diameter as the shroud 11, the radial blades 15 are provided on the outer side of the shroud 12 to improve the balancing of the hydraulic end thrust acting upon the impeller. The axially movable wall (disc 9) of the static seal is accommodated in a cylindrical recess 16 of the casing 1 which is provided with an inwardly projecting wall 17. A flanged member 18 with a cylindrical section 19 is tightly fixed to the hub 20 of the disc 9 by pressing or screwing, and between the outer periphery of the radial part 19 and the inner periphery of the wall 17 an elastic sealing ring 21 of circular cross section is arranged. The non-rotating member of the contact seal is, by way of example, represented by a ring 22 of suitable material and is fluid-tightly fixed to the member 18.

When the pump is primed but not running the springs 10 accommodated in cylindrical bores of the wall 17 act upon the flanged member 18 and force the static seal 6, 22 into close contact (see FIG. 1). The seal may be designed so that, if required, the positive pressure of the liquid filling the pump supports the action of the springs 10. The chamber 16 communicates with the space traversed by the seal blades, through the small peripheral clearance between the disc 9 and the casing 1 and, if required, by additional notches or slots provided at the periphery of the disc 9. Therefore, the same pressure as in the whole pump exists in the chamber 16, the elastic sealing ring 21 preventing leakage past the gap between the wall 17 and the member 18. A rounded shoulder 23 of the wall 17 holds the ring 21 in its proper position against the action of the internal pressure.

As soon as the impeller begins to rotate a centrifugal pressure is developed by the blades 14 which builds up from its minimum value near the hub 7 to its maximum at the blade tips. The liquid pressure obtaining near the periphery of the disc 9 is transmitted to the chamber 16 where it distributes equally so that the total thrust acting axially upon the disc 9 towards the impeller prevails over that acting upon the disc 9 in the opposite direction. Consequently, the resulting differential thrust counteracts the load of the springs 10, thus reducing the contact pressure of the static seal 6, 22. When the speed of the impeller is increased the centrifugal action of the blades 14 will form a liquid ring with a free internal surface near the impeller hub 7, see FIG. 1a, and the pressure in the chamber 16 increases in correspondence with the increasing centrifugal pressure generated by the blades 14, and the contact pressure between 6 and 22 is further decreased. At a certain speed which can be predetermined by calculation the differential pressure acting upon the disc 9 overcomes the spring forces, and the disc 9 together with the members 18, 19, 20 and 22 attached to it will be displaced axially towards the seal blades 14, thus separating the two components 6 and 22 of the static seal. No leakage will occur as the rotating liquid ring maintained by the seal blades 14 does not allow liquid to leak towards the impeller hub 7 and thence to pass through the open static seal to the outside. The axial movement of the disc 9 and the member connected thereto usually occurs suddenly, and it is limited by the flange 18 which contacts the wall 17. When this position is reached the face of the disc 9 facing the pump impeller is flush with the corresponding internal surface of the casing 1 leaving a small clearance with the blades 14. During the axial displacement of the disc 9 etc., the elastic ring 21 performs a rolling movement, and in its end position it is supported against the pressure in the chamber 16 by a shoulder 24 of the member 18. The free surface of the rotating liquid ring produced by the action of the seal blades 14 may settle, at full operational speed, at 25. The seal must be so designed that, under no circumstances, will this surface 25 reach the periphery of the disc 9. The chamber 16 will therefore always remain full of liquid. When the pump speed again slows down, the pressure in the chamber 16 drops, the liquid surface 25 returns towards the hub 7, but before it reaches the hub 7 the springs 10 will push the flange 18 and the connected disc 9 back towards the right so that the portions 22 and 6 of the static seal come in contact again.

The example shown in FIGS. 3, 3a and 4 includes a pump impeller of the unshrouded or open type with straight radial working blades 13a which are connected with the impeller hub 7a by a circular disc or wall 26. The seal blades 14a are located at the rear of the wall 26 and extend radially inward to the hub 7a, thus being of a greater radial length than the working blades 13a, as required. The non-rotating portion 22a of the contact seal is integral with the axially movable disc 9a the periphery of which is provided with a cylindrical section 27 and a flange 28. The springs 10a located in the cover 2a of the casing 1a force the static seal portions 22a and 6a into contact by acting upon the flange 28 (FIG. 3). A flexible metal or plastic bellows 29 is fluid-tightly connected, on the one hand, with the inner portion of the disc 9a, and on the other hand with the inner edge of a cover 30 the outer periphery of which is fluid-tightly fixed to the cover 2a of the pump casing 1a. Thus, the pressure chamber 16a is formed, in this example, by the parts 9a, 29 and 30. It communicates with the interior of the pump casing by holes 31 in the cylindrical section 27, and through the peripheral gap 32 between 27 and 2a. The functioning of this seal is the same as described with reference to FIGS. 1 and 1a. 3a represents the inlet, 4a the discharge duct, 5a the pump shaft and 8a the fixed screw or nut of the impeller, 25a is the liquid. Under operating conditions the free liquid surface 25 settles as shown in FIG. 3a, and the axial movement of the disc 9 is stopped when the flange 28 contacts the cover 2. It is important in the design of this combination of the seal with an unshrouded pump impeller that the circular wall 26 must extend radially somewhat beyond the circular gap 32, or be of the same diameter at least.

In FIGS. 5 and 5a also the seal is applied to an open impeller pump. Similar to FIGS. 1 and 1a, the axially movable disc 9b is tightly connected, at its inner portion, with a cylindrical member 19b which carries the non-rotating seal ring 22b and an outer flange 18b. The resilient seal between the movable disc 9b and the casing 1b (represented in FIGS. 1 and 3 by the ring 21 and the bellows 29, respectively) is constituted, in this example, by a flat resilient diaphragm 33 the inner edge of which is fluid-tightly connected with a corresponding face of the disc 9b, by bonding for instance, while the outer edge is fluid-tightly clamped against a face in a recess of the casing 1b by a cover 34. A number of cylindrical pins 35 fixed near the inner edge of the cover 34 carry the springs 10b which force the static seal 6b, 22b into contact by acting upon the flange 18b. FIG. 5a shows again the position of the seal under running conditions, where the seal blades 14b have formed a liquid ring with an inner surface 25b, and the liquid pressure in the chamber 16b has lifted the static seal ring 22b of the rotating portion 6b. The axial movement of the unit 9b, 18b, 19b, 22b is arrested by the flange 18b resting upon the end faces of the pins 35. 2b represents the front cover, 3b the inlet, 4b the discharge duct, 5b the pump shaft, 7b the impeller hub, 8b the end nut.

In all the designs hereinbefore described the springs 10, 10a, 10b can, under certain circumstances, be dispensed with, and the resilient members (21 in FIG. 1, 29 in FIG. 3, 33 in FIG. 5) can be so arranged that they will act as spring members to close the static seals. Suitable means can also be provided positively to prevent rotation of the non-rotating sections of the static seals whilst in contact with the rotary parts.

What I claim is:

1. A centrifugal pump comprising a casing, an impeller, an impeller chamber provided by said casing, a shaft for the said impeller and a rotary sliding contact seal comprising one member which is carried by the said shaft and a co-operating member, an axially displaceable wall carrying said co-operating member, said impeller comprising a wall which partitions the impeller chamber in the radial sense and carries blades on one side to serve as the working blades and blades on the other side to serve as seal blades, said seal blades being arranged to work in the space between the impeller wall and the said axially displaceable wall, said axially displaceable wall forming with the casing an annular chamber and constituting a movable wall of the said chamber, port means providing for communication between the said annular chamber in its peripheral region and the said space traversed by the seal blades, means between said axially displaceable wall and the said casing sealing said annular chamber operative also during displacement of said axially displaceable wall, the arrangement being such that liquid under pressure within the pump tends to urge the members of the contact seal into sealing engagement when the pump is static, and said seal blades serving, when the impeller is rotated at a sufficient speed, to centrifuge the liquid in the said space away from the shaft and to maintain part of the liquid centrifuged therein in the form of a liquid ring extending radially outwards beyond the said axially displaceable wall but covering the said port means so that the annular chamber is maintained filled and a pressure differential is set up on the opposite sides of said axially displaceable wall which lessens or eliminates the pressure contact between the members of the contact seal.

2. A centrifugal impeller pump according to claim 1 having a single entry means and shrouds for the working blades, one of said shrouds forming the said impeller wall which carries the seal blades, and the other of said shrouds carrying further blades on the side opposite that connected to the said working blades, said further blades and said seal blades extending radially outwards beyond the outer tips of the working blades.

3. A centrifugal impeller pump according to claim 1, said means between the axially displaceable wall and the said casing sealing said annular chamber comprising a sealing ring mounted between the said axially displaceable wall and the said casing.

4. A centrifugal impeller pump according to claim 1, said axially displaceable wall comprising a tubular hub surrounding the shaft and forming an inner peripheral wall of the said annular chamber, said means between the axially displaceable wall and the said casing sealing the said annular chamber comprising a sealing ring being between the outer periphery of said hub and an inner peripheral part of said casing.

5. A centrifugal impeller pump according to claim 1 in which the said axially displaceable wall comprises a tubular hub surrounding the said shaft, said casing having an internal peripheral surface spaced radially from and surrounding said hub, said means between the axially displaceable wall and the said casing sealing the said annular chamber comprising a sealing ring arranged between the external periphery of said hub and the said surface and being adapted to partake of a rolling action during displacement of said axially movable wall, and stop means on the said casing and on the said hub with which the said sealing ring co-operates.

References Cited in the file of this patent

UNITED STATES PATENTS

| | | |
|---|---|---|
| 2,465,526 | Goddard | Mar. 29, 1949 |
| 2,646,999 | Barske | July 28, 1953 |
| 2,698,584 | Stelzer | Jan. 4, 1955 |
| 2,873,986 | Murray | Feb. 17, 1955 |

FOREIGN PATENTS

| | | |
|---|---|---|
| 1,037,858 | Germany (Application KL. 5962) | Aug. 28, 1958 |
| 133,802 | Great Britain | Oct. 23, 1919 |
| 212,879 | Great Britain | of 1925 |
| 544,831 | Italy | June 20, 1956 |